United States Patent [19]
Burmester

[11] Patent Number: 5,597,066
[45] Date of Patent: Jan. 28, 1997

[54] ACCELERATION LIMIT SWITCH

[76] Inventor: Heino Burmester, Leibnizstrasse 17, D-42579 Heiligenhaus, Germany

[21] Appl. No.: 530,075

[22] Filed: Sep. 19, 1995

[30] Foreign Application Priority Data

Sep. 26, 1994 [DE] Germany ............ 44 34 349.3

[51] Int. Cl.$^6$ .................................................. H01H 9/00
[52] U.S. Cl. ...................... 200/292; 200/61.45 R; 200/61.45 M; 200/DIG. 29; 200/DIG. 9
[58] Field of Search ................ 200/503, DIG. 29, 200/292, 61.45 R, 61.46, 61.45 M, DIG. 9, DIG. 32

[56] References Cited

U.S. PATENT DOCUMENTS

| | | | |
|---|---|---|---|
| 5,053,588 | 10/1991 | Bolender | 200/61.45 M |
| 5,068,502 | 11/1991 | Devenport | 200/61.45 M |
| 5,237,134 | 8/1993 | Thuen et al. | 200/61.45 M |
| 5,322,981 | 6/1994 | Grossi, III et al. | 200/61.45 M |

Primary Examiner—David J. Walczak
Attorney, Agent, or Firm—Edwin D. Schindler

[57] ABSTRACT

An acceleration limit switch is disclosed, which includes a ball-shaped inertia body made of ferromagnetic material. The ball-shaped inertia body is maintained in a resting position by a permanent magnet opposed on a printed circuit board by two contact elements symmetrically engaging each other. An elastic, conductive diaphragm is mounted between the inertia body and the printed circuit board; the diaphragm being deformed when impacted by the inertia body and thereby connecting the contact element. The interior space of the acceleration limit switch, which is symmetrical with respect to rotation, has a ring-shaped bearing surface for a thin, conductive plastic mat. The printed circuit board, as the cover of the housing, rests on a housing bridge extending fully around, with a sealing ring being disposed on the housing bridge. The printed circuit board is supported by elastic hooks with deformation of the sealing ring, with the hook preferably being shaped by molding on the side of the housing.

9 Claims, 3 Drawing Sheets

ACCELERATION LIMIT SWITCH

BACKGROUND OF INVENTION

1. Technical Field of the Invention

The present invention relates, generally, to an acceleration limit switch.

More particularly, the present invention relates to an acceleration limit switch having a ball-shaped inertia body made of a ferromagnetic material. The body of the switch is maintained in a resting position by a permanent magnet opposed on a printed circuit board by two contact elements symmetrically engaging each other.

2. Description of the Prior Art

Acceleration limit switches are generally known to the prior art with one such switch being disclosed by Federal Republic of Germany Patent No. 30 22 878. The acceleration limit switch disclosed in this prior art reference consists of a housing having a permanent magnet, an inertia body supported by said permanent magnet, and a contact system. The contact system has a conductive mat and a printed circuit board with conducting paths engaging one another in the manner of a comb. The printed circuit board and the diaphragm are supported by a cover projecting across the latter on top; said cover having bores for receiving the connection pins extending therethrough.

Within the zone of the jacket, the cylindrical housing has a groove extending all around, in which an O-ring is inserted. When the cover is slipped on, its collar seals the interior space of the switch with deformation of the O-ring.

The prior art acceleration limit switch, which has been successfully used for many years, requires a molded, and therefore expensive, contact mat, a printed circuit board with pins soldered into the latter, and a cover provided with a collar. The type of sealing used requires very small tolerances for the housing and the cover.

SUMMARY OF THE INVENTION

It is, therefore, an object of the present invention to decisively simply and reduce the cost of known acceleration limit switches, such as the one described in Federal Republic of Germany Patent No. 30 22 878, without any loss with respect to reliability and response accuracy.

It is a further object of the present invention to overcome the disadvantages inherent in prior art devices.

The foregoing and related objects are achieved by the present invention in which an acceleration limit switch is provided which includes a ball-shaped inertia body made of ferromagnetic material. The ball-shaped inertia body is maintained in a resting position by a permanent magnet opposed on a printed circuit board by two contact elements symmetrically engaging each other. An elastic, conductive mat is mounted between the inertia body and the printed circuit board, the mat being deformed when impacted by the inertia body and thereby connecting the contact element.

The interior space of the acceleration limit switch, which is symmetrical with respect to rotation, has a ring-shaped bearing surface for a thin, conductive plastic mat. The printed circuit board, as the cover of the housing, rests on a housing bridge extending fully around, with a sealing ring being disposed on the housing bridge. The printed circuit board is supported by elastic hooks with deformation of the sealing ring, with the hook preferably being shaped by molding on the side of the housing.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the invention.

BRIEF DESCRIPTION OF THE DRAWING FIGURES

In the drawing, wherein similar reference numerals denote similar features throughout the several views.

DETAILED DESCRIPTION OF THE DRAWING FIGURES AND PREFERRED EMBODIMENTS

Figure 1:
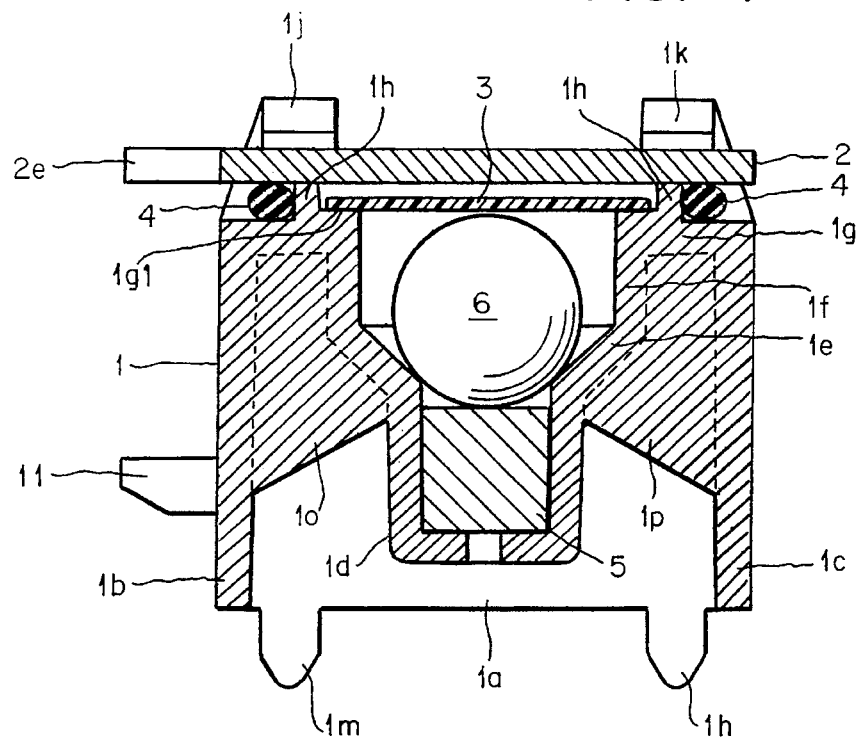
FIG. 1 shows a longitudinal section through the acceleration limit switch of the present invention.

Turning now, in detail, to an analysis of the drawing figures, in FIG. 1, reference numeral 1 denotes the housing shown in a longitudinal sectional view; housing 1, for the most part, being designed as a hollow body. The, preferably, square housing, which is manufactured from a plastic material by injection molding, is substantially comprised of four relatively thin side walls. The back wall 1a is partly visible. Additionally, the side walls, 1b, 1c can be seen and are shown in sectional view.

The interior housing is important to the functioning of the acceleration limit switch. Housing 1 comprises a hollow-cylindrical section 1d; a hollow-cone like section 1e; and a hollow-cylindrical section 1f. Upwardly, the inside and outside portions of housing 1 are connected by flange 1g. Flange 1g leads into a ring-shaped bridge 1b, on which a printed circuit board 2 rests. A thin, circular conductive plastic mat 3, which rests on a ring-shaped support surface 1g1, is disposed within the bridge. A sealing O-ring 4 is supported on the outside around the bridge 1h. The printed circuit board 2, at the same time, represents the cover of the housing. The printed circuit board 2 compresses the O-ring 4 in a sealing way and is supported in position by elastic hooks 1j, 1k. These elastic hooks—a total of four in all with one on each of the corners—are molded to project from the housing.

A cylindrical permanent magnet 5 is pressed into part 1d of the inside of the housing. A ferromagnetic inertia body is mounted and rests in the hollow-cone like section 1e; said body being supported by magnet 5 with a highly defined force.

When the acceleration limit switch is subjected to an acceleration above the limit value, the inertia body 6—which is a steel ball—detaches itself from magnet 5 and strikes against conductive mat 3. The mat bridges the conductive paths for a brief period of time; the arrangement of said paths is shown in the top view of FIG. 2. Provision is made for the conductor paths 2a, 2b on the printed circuit board 2; said paths opposing each other in the center 2c in the manner of a comb. When the conductive mat 3 is pressed onto the center 2c, several part contacts are made, so that safe signalling is assured.

The printed circuit board 2 has two connection strips 2d, 2e, which can be soldered into a mother board.

With respect to the concrete structure of housing 1, it should be added that a flap 11 projects from the left side wall 1b, so that together with the connection strips 2d, 2e, a three-point mounting is obtained.

For alternative mounting in a plane displaced 90°, the legs 1m, 1n are shaped by molding on the back wall 1a. Two additional legs are disposed on the parallel wall, which is not shown.

The stiffening bridges 1o, 1p are shaped by molding between the side walls 1b, 1c and the interior of the housing 1d, 1e. In this manner, the total housing can be made with very thin walls. This has the advantage that shrinkage and distortion during cooling of the hot injection-molded housing are kept to a minimum. In order to protect the conductor paths against oxide or sulfide coatings, the said paths can be tinned in a solder bath, or galvanically.

Figure 2:
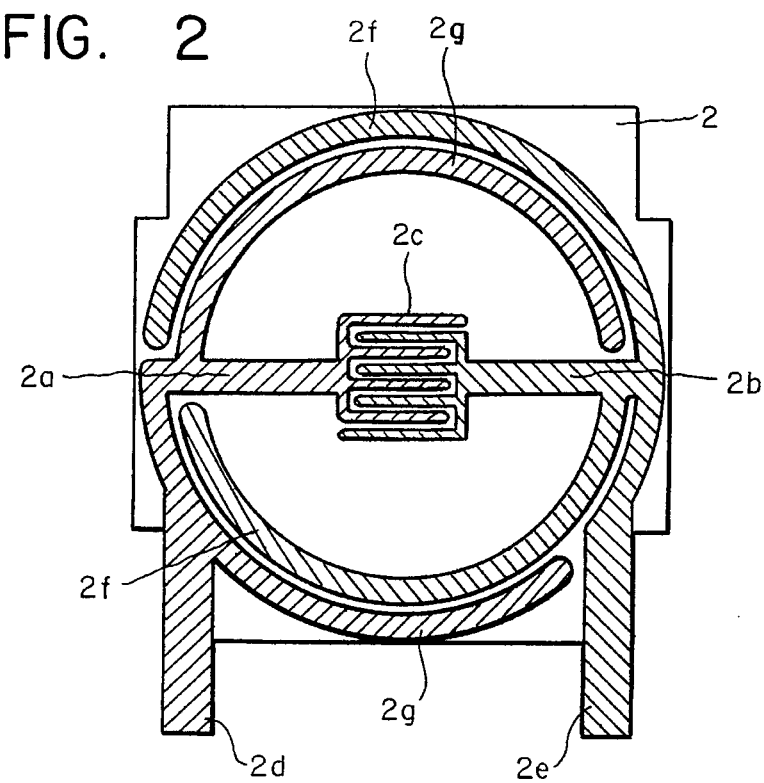
FIG. 2 shows the printed circuit board.

FIG. 2 shows that the conductor paths engage each other in zone 2c in a comb-like form. However, the contact elements on the printed circuit board conceivably could engage one another in a star-like manner from the inside outwardly and from the outside inwardly, in order to obtain a completely non-directional response.

The conductor pattern according to FIG. 2 shows, additionally, that within the zone of the bearing surface of the O-ring, the two conductor paths 2f, 2g are installed in the form of a ring, extending parallel with each other. In this manner, the sealing power of the O-ring is particularly good in the zone between the raised conductor paths.

Figure 3:
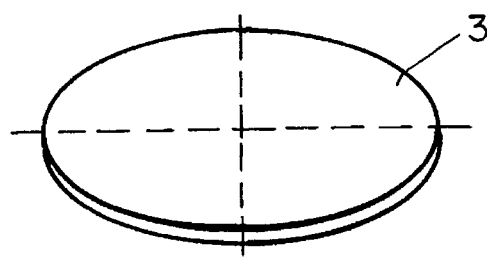
FIG. 3 shows the conductive plastic mat.

FIG. 3 shows a perspective view of the conductive mat 3, which is designed in the form of a thin, circular disk.

Figure 4:
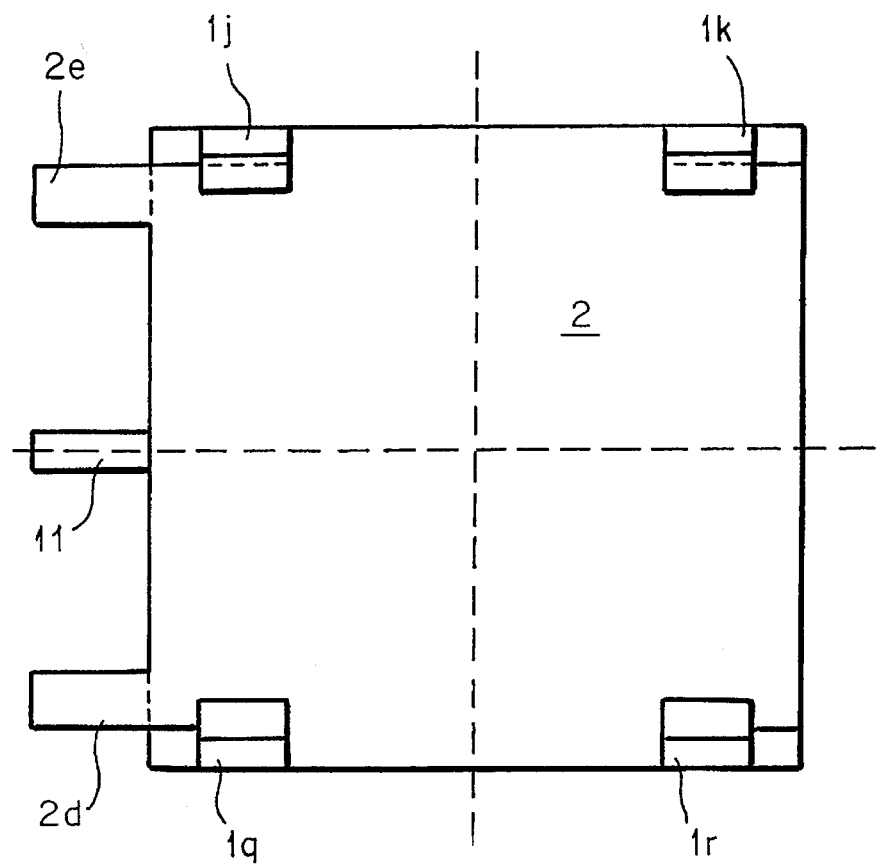
FIG. 4 shows a top view of the acceleration limit switch of FIG. 1.

FIG. 4 shows the limit switch from a top view. Visible from this view are the four spring hooks, 1j, 1k, 1q, 1r. The hooks force the printed circuit board 2 against the O-ring seal; the latter being disposed underneath.

Figure 5:
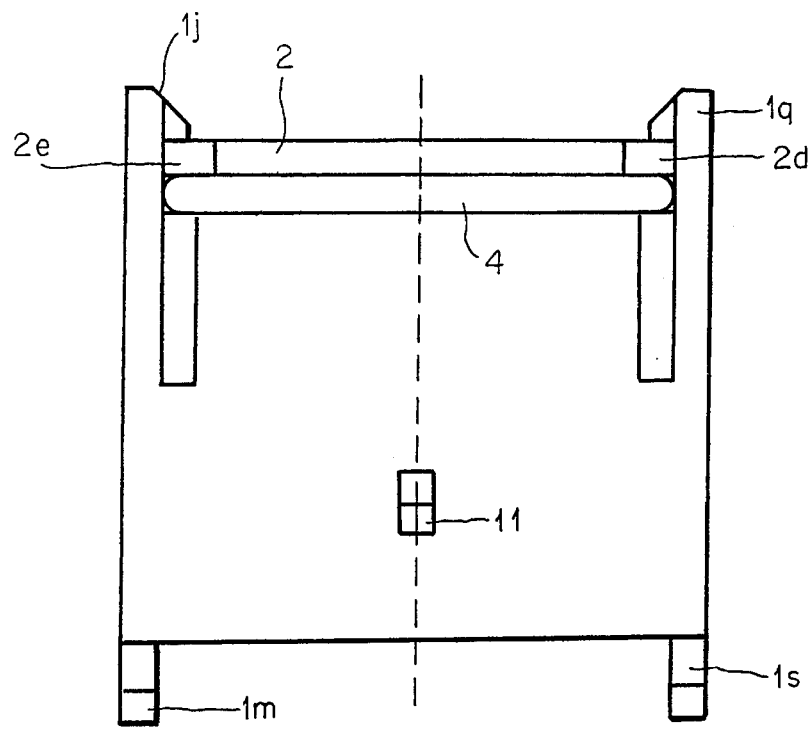
FIG. 5 shows a left-side view of the acceleration limit switch of FIG. 1.

FIG. 5 shows a left-side view of the limit switch of the present invention. Visible are the elastic hooks 1j, 1q, which are produced by deep cuts.

Figure 6:
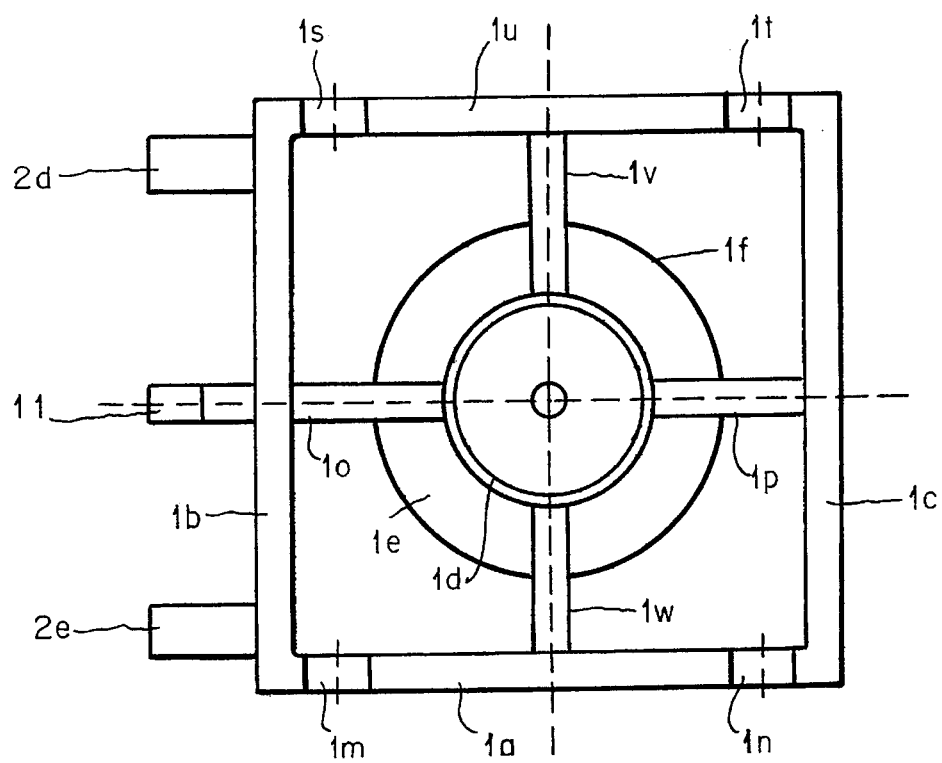
FIG. 6 show a right-side view of the acceleration limit switch of FIG. 1.

FIG. 6 shows the limit switch from a bottom view. The stiffening bridges 1o, 1p, 1v, 1w are arranged between the side walls 1a, 1b, 1c, 1u and the interior housing parts 1d, 1e, 1f; said stiffening bridges providing the housing with optimal stability combined with lowest possible weight.

While only several embodiments of the present invention have been shown and described, it will be obvious to those skilled in the art that many modifications may be made to the present invention without departing from the spirit and scope thereof.

LIST OF REFERENCE NUMERALS

1 - housing
1a - back wall
1b, 1c - side walls
1d - hollow-cylindrical section
1e - hollow-conical section
1f - hollow-cylindrical section
1g - flange
1g1 - supporting surface
1h - ring-shaped bridge
1j, 1k - elastic hooks
11 - flap
1m, 1n - legs
1o, 1p - stiffening bridges
1q, 1r - spring hooks
1s, 1t - feet
1u - side wall
1v, 1w - stiffening bridges
2 - printed circuit board
2a, 2b - conductor paths
2c - center
2d, 2e - connection strips
2f, 2g - conductor paths
3 - conductive plastic mat
4 - O-ring seal
5 - permanent magnet
6 - inertia body

What is claimed is:

1. An acceleration limit switch, comprising:

a housing;

a ball-shaped inertia body made of a ferromagnetic material and having a housing bridge;

a permanent magnet;

a printed circuit board with said ball-shaped inertia body being maintained in a resting position by said permanent magnet spaced from said printed circuit board, said, printed circuit board having two contact elements symmetrically positioned with respect to each other, said printed circuit board acting as a cover for said housing;

an elastic, conductive plastic mat being mounted between said ball-shaped inertia body and said printed circuit board, said mat being deformed when impacted by said ball-shaped inertia body, thereby connecting said two contact elements;

a ring-shaped support surface for supporting said conductive plastic mat, said ring-shaped support surface being contained within an interior space of said housing with said interior space being symmetrical;

elastic hooks being formed on said housing; and, a sealing ring being disposed outside of said housing with said printed circuit board being supported between said elastic hooks and said sealing ring to thereby cause deformation of said sealing ring.

2. The acceleration limit switch according to claim 1, wherein said printed circuit board includes two connection strips shaped thereon by molding, said printed circuit board further including conductor paths which are tinned.

3. The acceleration limit switch according to claim 1, wherein said housing, including said elastic hooks, are injection-molded from a dimensionally-stable, elastic plastic material.

4. The acceleration limit switch according to claim 1, wherein said housing is square-shaped and primarily hollow, said housing having four side walls, a top connection flange and a funnel-like interior housing adjoining said top connection flange the latter for receiving said permanent magnet and said inertia body.

5. The acceleration limit switch according to claim 4, further comprising stiffening bridges being arranged between two of said four side walls and said funnel-like interior housing.

6. The acceleration limit switch according to claim 1, wherein said permanent magnet is a cylindrical permanent magnet without a short-circuit component.

7. The acceleration limit switch according to claim 1, wherein said two contact elements of said printed circuit board are positioned with respect to each other in a comb like manner for making a response non-directional.

8. The acceleration limit switch according to claim 1, wherein said sealing ring is an O-ring.

9. The acceleration limit switch according to claim 8, wherein within a zone of a supporting surface for said O-ring, two raised conductor paths on said printed circuit board are arranged ring-shaped and parallel with each other for enhancing sealing.

\* \* \* \* \*